United States Patent [19]
Lockhart

[11] Patent Number: 5,439,020
[45] Date of Patent: Aug. 8, 1995

[54] DETERGENT MIXING APPARATUS AND METHOD

[76] Inventor: Barton Lockhart, 905 Red Oak La., Corsicana, Tex. 75110

[21] Appl. No.: 249,961

[22] Filed: May 27, 1994

[51] Int. Cl.⁶ .............................................. B01F 5/04
[52] U.S. Cl. ........................................ 137/3; 137/268; 137/889; 422/281
[58] Field of Search ................. 422/261, 281; 137/3, 137/268, 889

[56] References Cited

U.S. PATENT DOCUMENTS

| | | | |
|---|---|---|---|
| 1,947,994 | 2/1934 | Larson . | |
| 1,954,261 | 4/1934 | Pierce | 137/3 |
| 2,973,718 | 3/1961 | Deutsch | 137/889 |
| 2,979,066 | 4/1961 | Christie | 137/3 |
| 3,447,505 | 6/1969 | Wagner | 137/889 X |
| 3,459,334 | 8/1969 | Evans | 222/132 |
| 3,595,268 | 7/1971 | Archer . | |
| 3,976,087 | 8/1976 | Bolton et al. . | |
| 4,020,865 | 5/1977 | Moffat | 137/268 |
| 4,171,710 | 10/1979 | Boynton et al. | 137/889 X |

FOREIGN PATENT DOCUMENTS 1505431 8/1969 Germany .

OTHER PUBLICATIONS

Hydrominder Model 506 Brochure; pp. 9–12; Mar. 1991.

*Primary Examiner*—Robert G. Nilson
*Attorney, Agent, or Firm*—Stephen R. Greiner

[57] ABSTRACT

A fluid handling apparatus and method for combining dissolved solid and liquid phase detergent constituents with water from an external source in predetermined proportions is disclosed. The apparatus includes a dissolution tank for dissolving powdered detergent constituents deposited therein and a number of other supply containers each filled with a discrete liquid chemical. A manifold, connecting the dissolution tank and at least one liquid chemical supply container, is in fluid communication with a venturi chamber. When pressurized water from the external source is directed or jetted through the venturi chamber, detergent constituents in the dissolution tank and the chemical supply container are drawn into the venturi chamber in proper proportion for mixing with pressurized water and discharged into a holding tank for subsequent use.

7 Claims, 5 Drawing Sheets 5,439,020

DETERGENT MIXING APPARATUS AND METHOD

FIELD OF THE INVENTION

The present invention relates generally to fluid handling systems having plural tanks or compartments connected for serial flow, and, more particularly, to a system for mixing and diluting detergent components for local spray washing purposes.

BACKGROUND OF THE INVENTION

Detergent products employed in automated car washes usually include two broad types of chemical products inorganic alkalinity builders and organic surfactants. These detergents are typically delivered to car wash operators, ready to use, in concentrated liquid and powdered forms. Various difficulties, however, limit the concentration at which the detergents can be distributed and negatively influence the profit margin of capital-intensive, car washing businesses.

Because of well-known instability problems, liquid detergents must often be diluted with water and enhanced with costly stabilizing agents to prevent their breakdown during transit and subsequent storage prior to use. The disadvantages associated with increasing the fraction of water in a given detergent mixture are many, and associated manufacturing, packaging, transporting, and handling costs normally rise in proportion to the amount of water contained therein. Of course, highly concentrated liquid surfactants, absent the usual inorganic compounds, can be procured, but such are generally considered to be less effective as cleaning agents.

Detergents, delivered in powdered form, typically include a mix of finely divided phosphates, silicates and carbonates as well as a modest amount of evenly distributed liquid surfactant. Generally, the surfactant concentration in the resulting detergent composition is limited to approximately 15 percent by weight. Excess amounts of the surfactant result in powders wherein the individual granules tend to adhere to one another and fail to flow through state-of-the-art blending and dispensing equipment.

Dispensing premixed, powdered detergents in a modern car wash is especially problematic. Hand measurement of the detergent by inexperienced workmen is time consuming and prone to mistake. Detergent overconcentration can result in waste if separation of the several detergent components in the solution holding tank results. Automatic dispensing equipment, on the other hand, frequently yields detergents which lack effective concentrations of intended constituents due to their relative variations in water solubilities. Further, prolonged and unchecked dampness can lead to consolidation of the powdered material so as to completely prevent admission of the detergent into the car wash fluid stream through automated means.

SUMMARY OF THE INVENTION

In view of the above-mentioned problems, it is the principal object of the instant invention to provide an improved detergent mixing apparatus wherein discrete, highly-concentrated inorganic and organic compounds (replacing the heretofore standard liquid and powdered detergent mixtures of relatively dilute form) can be mixed in the proper proportion for immediate discharge into a car wash spraying system. These detergent chemicals, then, can be supplied as economical, highly-concentrated powders and liquids in stable form.

It is another object of the invention to provide a detergent mixing apparatus, for use with an external source of pressurized water, with a venturi and manifold assembly for drawing a number of discrete liquid chemicals into the flow of pressurized water passing through the assembly, the water flow being regulated by a float-actuated control valve capable of terminating the flow of pressurized water when the liquid level in the mixed detergent holding tank reaches a determined elevation.

It is a further object of the sent invention to provide a detergent mixing apparatus with a plurality of venturi and manifold assemblies, each having a common liquid feed from a single chemical supply container as well as additional and segregated liquid feeds so as to produce liquid cleaning agents having different washing characteristics and abilities.

It is an additional object of the instant invention to provide a detergent mixing apparatus with an improved venturi and manifold assembly which may be readily adapted for use with variable numbers of liquid detergent constituents and includes a number of metering tips, each connected between a manifold inlet and its associated liquid chemical supply container for controlling the relative proportion of liquid chemical drawn into the manifold.

It is another object of the invention to provide a detergent mixing apparatus of the type described wherein one of the liquid chemical supply containers is a dissolution tank for dissolving powdered chemicals, such as inorganic alkalinity builders, in water. A second float-actuated control valve restores the liquid level in the dissolution tank to a determined elevation by the addition of water whenever sufficient quantities of liquid have been drawn therefrom.

It is a further object of the invention to provide a detergent mixing apparatus with a dissolution tank including a submersible pump for circulating liquid to expedite the dissolving of powdered chemicals placed therein, the fluid discharge from the pump being directed into a bifurcated conduit having a first discharge opening positioned so as to impart a rotating motion to the tank contents and a second discharge opening having a strainer attached thereto A further object of the instant invention is to provide an improved method for mixing detergent chemicals at a site proximate their ultimate use including the steps of: dissolving an inorganic chemical composition in water to form a saturated solution, providing a number of discrete liquid detergent additive supplies, serially fluidly connecting at least one of the liquid detergent additive supplies and the saturated solution supply to a manifold. drawing at least one liquid detergent additive and the saturated solution from the manifold and into a flowing stream of water, and transferring the at least one liquid detergent additive and the saturated solution in the flowing stream of water to a holding tank so that it may be drawn off for ultimate use.

It is an object of the invention to provide improved elements and arrangements thereof in a detergent mixing apparatus for the purposes described which is inexpensive, dependable and fully effective in accomplishing its intended purposes.

These and other objects of the sent invention will become readily apparent upon further review of the following specification and drawings.

BRIEF DESCRIPTION OF THE DRAWINGS

The sent invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
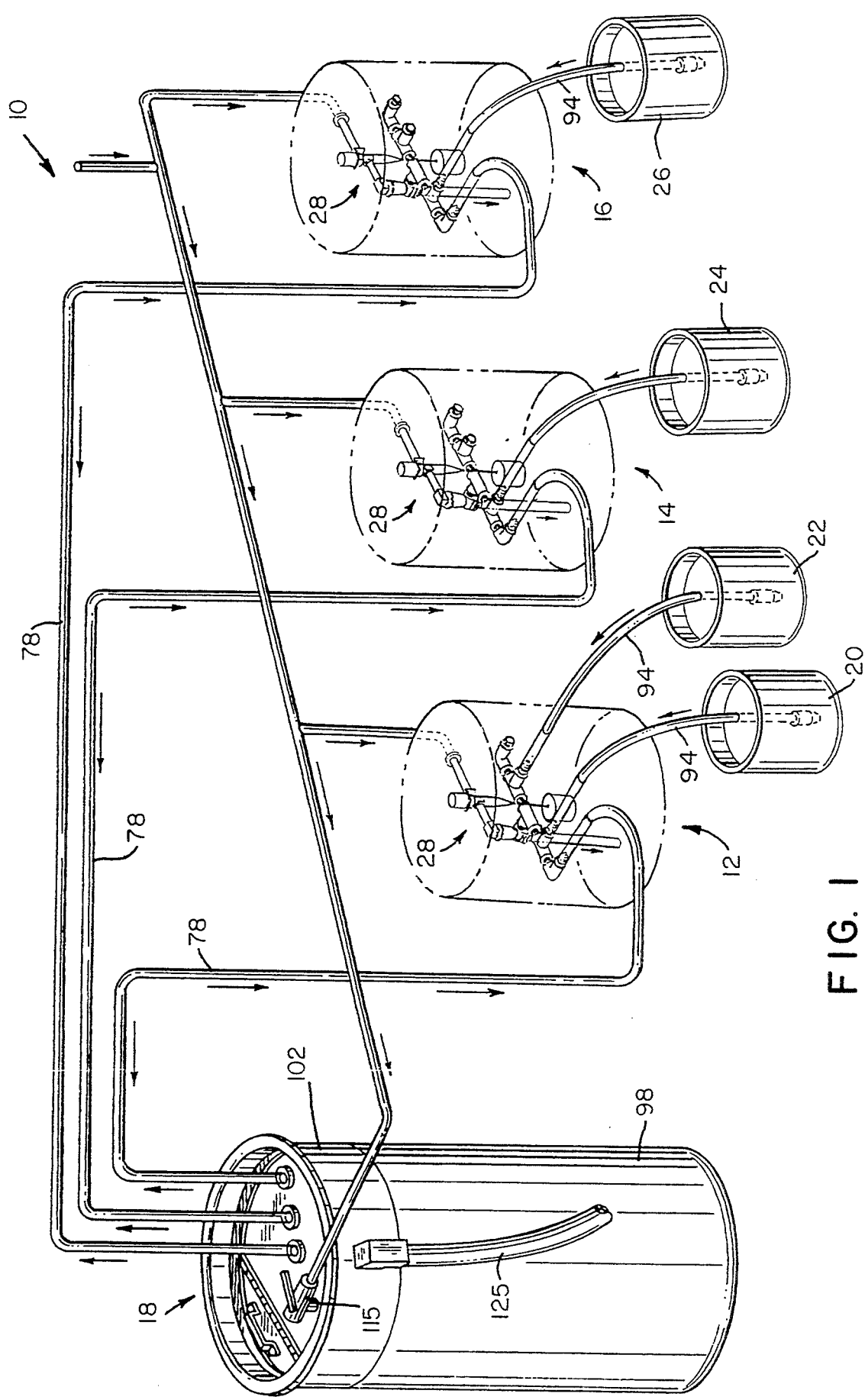
FIG. 1 is a perspective view of a detergent mixing apparatus in accordance with the sent invention.

Referring now to FIG. 1, a detergent mixing apparatus 10 in accordance with the sent invention is illustrated. In the usual application, the apparatus 10 will be positioned at a site, such as an automated car wash, where a detergent solution of predetermined concentration is required. In its preferred form, the apparatus 10 includes a series of holding tanks 12, 14 and 16 for making and storing a finished liquid detergent from proper proportions of two or more detergent constituents, the detergent solution being most suitable for spray washing purposes. In fluid communication with the holding tanks 12, 14 and 16 is a dissolution tank 18 which converts finely-divided inorganic solids into a saturated liquid for controlled distribution to the holding tanks. A series of shipping containers 20, 22, 24 and 26 also in fluid communication with the holding tanks 12, 14 and 16 provides a supply of liquid surfactants and other detergent additives thereto.

Each of the shipping containers 20, 22, 24 and 26 holds a liquid detergent constituent at an elevation lower than that of the surface of the holding tanks 12, 14 and 16 to vent siphoning of liquid from the shipping containers. The liquid detergent constituent which may include, by way of example only, one or more surfactants, foamers, wetting agents, couplers, dyes and solvents. While only four are shown, additional containers may be provided as required in a particular installation of the instant invention. The liquids stored in the various shipping containers require the addition of no further additives prior to being withdrawn therefrom.

Figure 2:
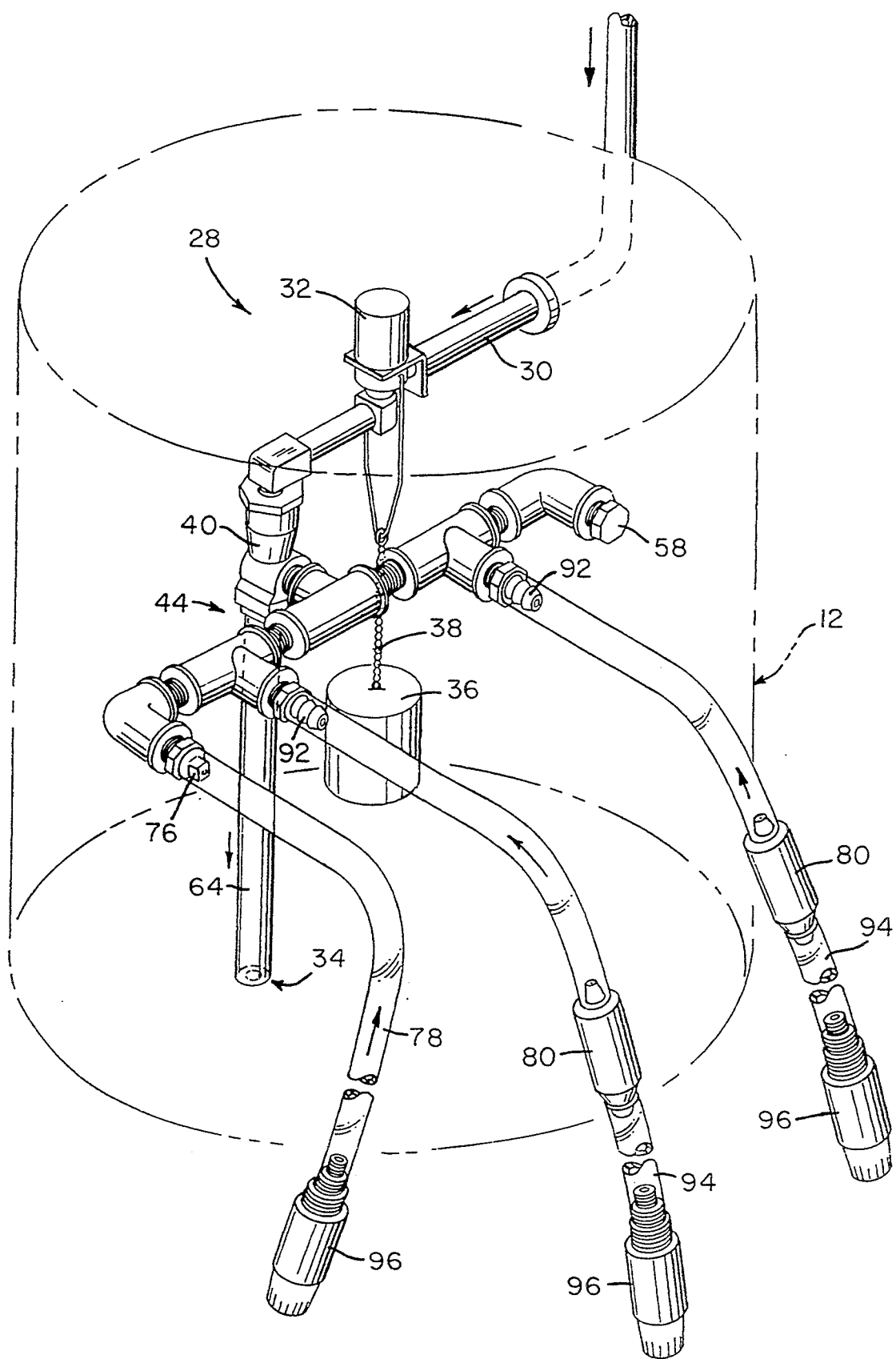
FIG. 2 is a perspective view of the manifold and venturi assembly of the sent invention, the holding tank shown in broken lines.

Each of the holding tanks 12, 14 and 16 is provided with a manifold and venturi assembly 28 for the controlled admission of detergent constituents thereto in response to internal liquid level variations. FIG. 2 illustrates the preferred manifold and venturi assembly 28 positioned within the holding tank 12 shown in broken lines. As may be seen, the water inlet conduit 30, being a rigid tube extending through the side wall of the tank 12, provides support for the assembly 28 above the tank bottom.

The assembly 28 includes a float-actuated control valve 32 for terminating the flow of pressurized water from the inlet 30 to the outlet 34 when the liquid level in the tank 12 reaches a predetermined height. In operation, the valve 32 is selectively activated by the motion of a cooperating float 36. The float 36 rises with the liquid level in the holding tank 12 allowing the control valve 32 to close at a point when the weight of the float 36, transmitted through chain 38, releases spring tension in the valve. Likewise, lowering of the liquid level causes the float 36 to exert a downward tension through the chain 38 and open the control valve 32 to permit water from a municipal source, or any other means for delivering water under a pressure of at least 40 PSI, to enter the tank 12. As will become apparent, then, a supply of liquid detergent can be automatically made anytime the level in the holding tank 12 falls below a determined level.

Figure 3:
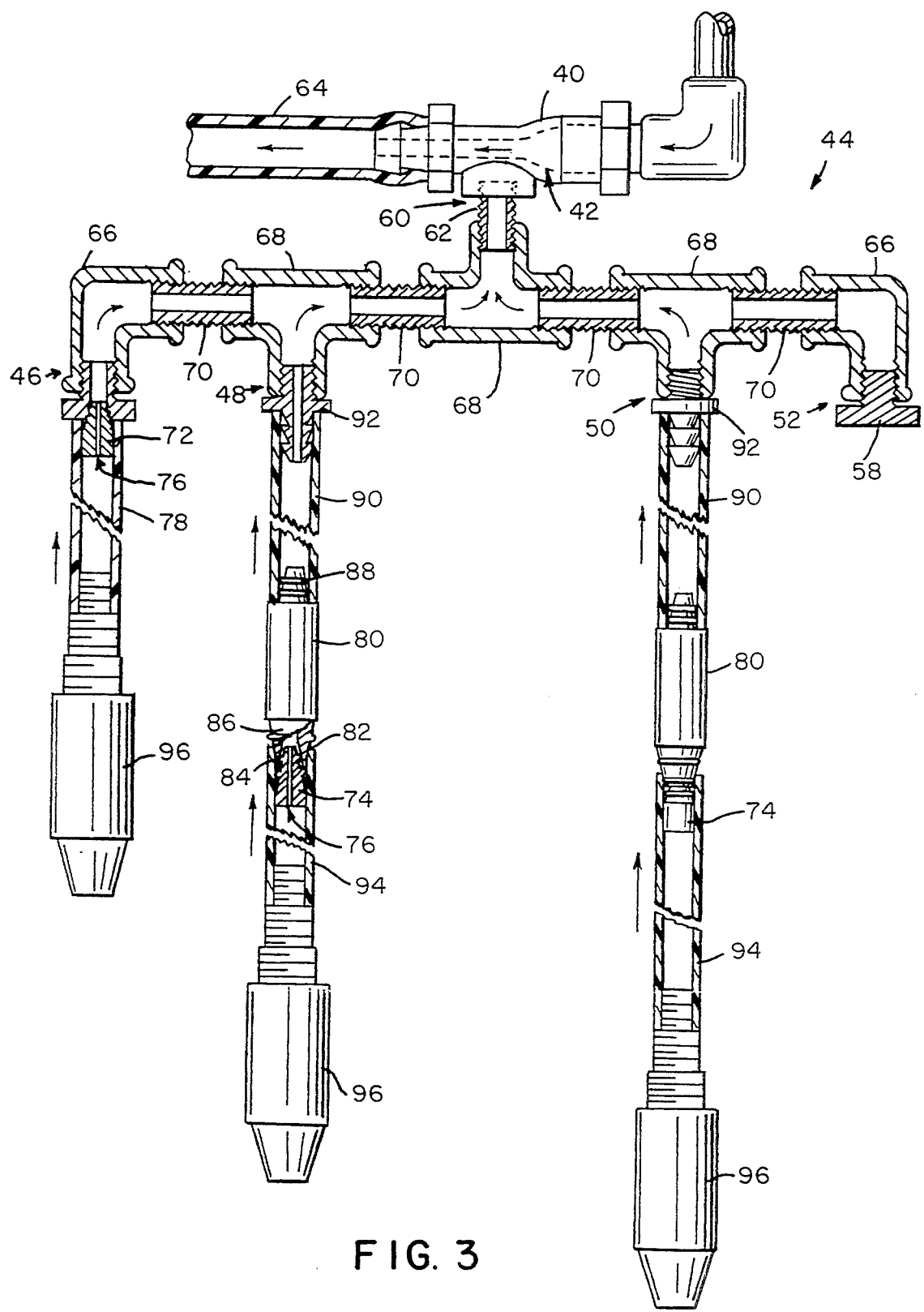
FIG. 3 is a cross-sectional view of a portion of the manifold and venturi assembly showing details thereof.

In fluid communication with the valve 32, and located downstream therefrom, is an eductor 40 having in its interior a venturi chamber 42, shown by broken lines in FIG. 3, for creating a partial vacuum and drawing in appropriate proportions of detergent constituents for mixing with water flowing from the valve 32 and through the venturi chamber 42. To this end, there is provided a manifold 44 having a plurality of inlets 46, 48, 50 and 52 in fluid communication with the dissolution tank 18 and the shipping containers 20 and 22 respectively. The remaining inlet 52 is shown as being closed by a plug 58; however, another shipping container may be connected thereto in accordance with need. As is shown most clearly in FIG. 3, the manifold 44 includes a single outlet 60 connected by way of a threaded nipple 62 to the central portion of the eductor 40 to communicate with the venturi chamber 42 therein. After entrainment in the water flow stream, the mixture of detergent constituents from the dissolution tank 18 and containers 20 and 22 flows from the venturi chamber 42 into a flexible, discharge tube 64 connected to the discharge end of the eductor 40 for conveyance into the holding tank interior through outlet 34.

In the form illustrated in FIG. 3, the manifold 44 is assembled from a number of well-known pipe fittings including ells 66, tees 68, and threaded nipples 70. It should be readily apparent that such elements are interchangeable among themselves and may be added to, or subtracted from, as the need arises. Thus, it is possible to rapidly construct a similar manifold with inlets greater than four in number, and perhaps as few as two, if the need arises. Of course, the manifold 44 could be integrally formed from suitable thermoplastic materials and the like; however, the ability to increase or decrease the number of inlets in accordance with need would be sacrificed.

The rate at which detergent constituents are drawn into the manifold 44 and venturi chamber 42 through the inlets 46, 48, 50 and 52 is controlled by metering disks or tips 72 and 74, each having an orifice 76 of suitable size for limited liquid flow therethrough. The size of the orifice 76 may be varied in accordance with the relative viscosities of the detergent constituents being delivered to the manifold 44 as well as the relative proportions of those constituents desired to be in the solution discharged from the venturi 42. It has been established, under conditions of ordinary use, that a liquid detergent constituent having a viscosity of 1.0 centipoise will be diluted with water at a ratio of approximately 5:1 through a single orifice 76 having a diameter of 0.128 inches. By employing an orifice 76 having a diameter of 0.010 inches, on the other hand, the same liquid will be diluted at a ratio approximately 240:1. Thus, by modifying orifice size, the relative proportions of detergent constituents may be varied considerably.

The metering tips 72 and 74 are separately mounted. The metering tip 72, regulating the flow from the dissolution tank 18, is threadably secured to the manifold inlet 46. Fastened to the portion of the metering tip 72 projecting outwardly from the inlet 6 is one end of a flexible conduit 78 in fluid communication with the dissolution tank 18. The metering tips 74 regulating flow from the shipping containers 20 and 22, on the other hand, are fitted within check valves 80 isolating the metering tips 74 from manifold backflow which can cause blockages in the several orifices 76. A conically-shaped and close-fitting bore 82 in the inlet end of each of the check valves 80 partially receives the correspondingly tapered portion of the metering tips 74. A series of laterally spaced annular rings 84 projecting outwardly from the tapered portion of each metering tip 74 helps secure such in frictional engagement with the check valve 80. The portion of the metering tip 74 extending from the check valve 80 permits such to be readily grasped and withdrawn from the bore 82 for replacement or cleaning as needed.

Aside from the tapered bore 82, each of the check valves 80 is of well-known configuration including a tapered inlet 86 and a similarly-shaped tapered outlet 88. The tapered form of the outlet 88 permits the ready fastening of one end of a length of flexible tubing 90 for joining the valve 80 to the manifold 44 for flow therebetween. A suitable, tapered fitting 92 is provided to join the second end of the tubing length 90 to the manifold itself. Similarly, the tapered inlets 86 permit the fastening of conduits 94 for receiving liquid detergent constituents from the shipping containers 20 and 22. Like the conduit 78 joining the dissolution tank 18 to the manifold 44, the conduits 94 in fluid communication with the shipping containers 20 and 22 include a length of flexible plastic tubing having a foot valve 96 secured at its inlet. Each foot valve 96 includes an internally positioned, fine-meshed screen and a check valve (both not shown). The screens vent any undissolved inorganic material or other macroscopic debris from entering the conduits 78 and 94 whereas the check valves eliminate the possibility of fluid siphoning through the conduits into the dissolution tank 18 and various shipping containers.

Figure 4:
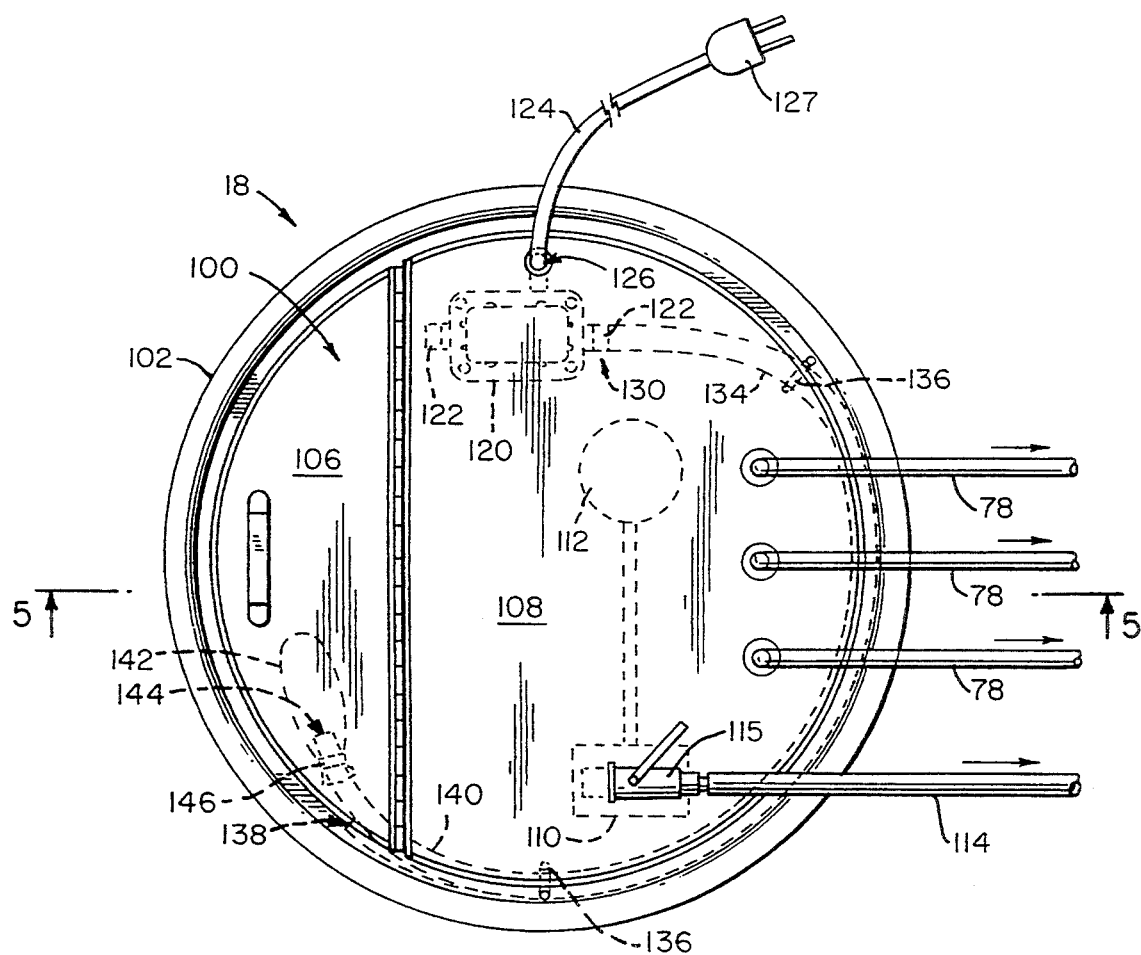
FIG. 4 is a plan view of the dissolution tank of the invention.
Figure 5:
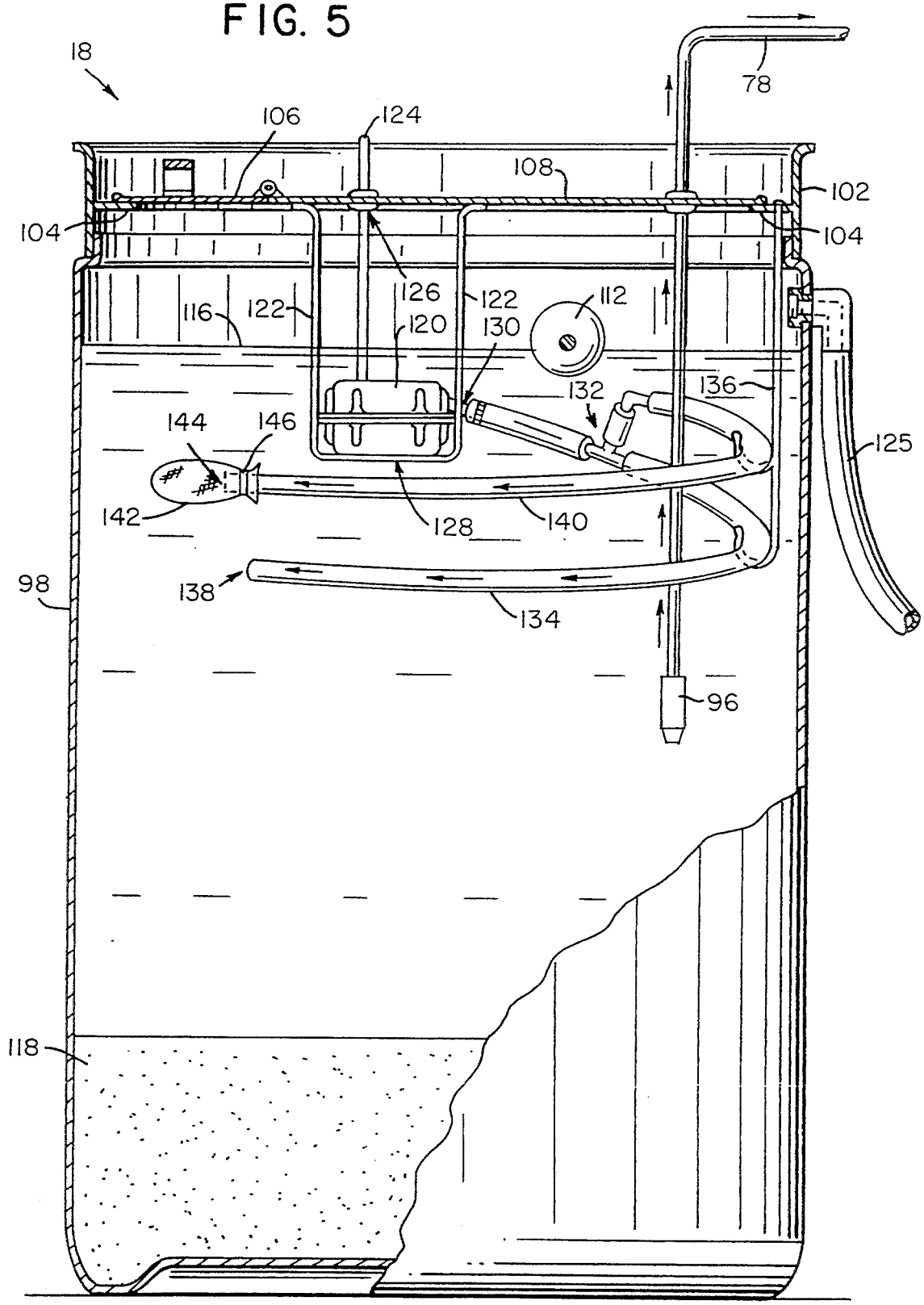
FIG. 5 is a cross-sectional view of the dissolution tank taken along line 5—5 of FIG. 4.

Referring now to FIGS. 4 and 5, the dissolution tank 18 may be seen. Preferably, the tank 18 comprises a 55-gallon capacity drum or barrel 98 closed at its top by a removable and hinged lid 100. A circumferential ring 102, having an inwardly-directed annular shoulder 104, is secured to the top of the barrel 98 for supporting the lid 100 within the upper end thereof. Although provided with an overall cylindrical configuration, the tank 18 may be formed in any desired shape or capacity to better allow it to conform to the space requirements of a particular installation. However, as relatively dense solid material will be disposed upon the bottom of the tank for dissolution in water, it is desirable to maximize, when practicable, the area of contact between the solid and liquid components. Thus, by increasing the cross-sectional area or "footprint" of the tank 18, the rate of dissolution of solid material in water will be increased proportionately.

The barrel 98 and ring 102 may be fabricated from any material suitable for storing or transporting liquid chemical compositions. Nevertheless, molded polyethylene has been found to be satisfactory as it is resistant to both the action of the usual detergent components and the often severe impacts caused by mishandling during use. Polyethylene has the added benefit of being somewhat translucent when molded in thicknesses suitable for use in barrels. Thus, an observer may readily gauge the relative levels of solid and liquid materials positioned within such a barrel from a distance and without resort to removal of the lid 100.

The lid 100, fabricated from stainless steel sheet material, is adapted to substantially close the opening in the upper end of the barrel 98. The lid 100 includes a handled door 106, for access into the barrel proper, hingedly attached to a stationary portion 108 adapted to rest upon the annular shoulder 104 at all times during use. Threaded fasteners (not shown) may be provided for rigidly securing the stationary portion 108 to the circumferential ring 102. The lid 100 need not completely seal the opening in the barrel 98 so as to vent the admission of air and need not be provided with any particular shape. In short, it is believed that any configuration closely conforming to that of the opening in top of the barrel 98 will suffice for the purposes intended.

The stationary portion 108 supports a valve 110 having a cooperating float 112 for admitting pressurized water from a municipal source, indicated generally at 114, into the tank 18. When the fluid level 116 falls below a set elevation, the float 112 actuates the valve 110 to initiate the flow of water into the tank 18 so as to return the level to a slightly greater determined height. Fresh water entering the tank 18 dilutes the solution located therein and permits the further dissolution of solid detergent materials 118 at the tank bottom.

A manually-operated valve 115 of well-known construction is provided in the inlet 114 for isolating the dissolution tank 18 from the remainder of the apparatus. In a like manner, similar valves (not shown) may be provided to the holding tanks 12, 14 and 16 for operating such separately, or all concurrently, if desired.

An electrically-powered, submersible pump 120 is suspended beneath the stationary portion 108 by brackets 122. An electrical conduit 124 passes through a small hole 126 in the stationary portion 108 and offers a source of power to the pump 120 for driving an internal impeller or other fluid propelling means (not shown). A plug 127 at the free end of the conduit 124 permits attachment thereof to a well-known electrical wall outlet. The pump 120 includes a fluid inlet 128 at its bottom and a fluid outlet 130 positioned below the liquid level 116 of the tank 18 at all times during normal operation.

The fluid outlet 130 is connected to a bifurcated conduit indicated generally at 132. One conduit leg comprises a flexible hose 134 horizontally supported against the side walls of the barrel 98 by a pair of clasps 136. The discharge opening 138 of the hose 134 is horizontally directed and, thus, not pointed toward the granular solids 118 which may be disposed upon the tank bottom. A second conduit leg branches from the first and includes a flexible hose 140 having a sock 142 of finely woven material joined about its discharge opening 144 so as to act as a liquid filter. A band of hook and loop fastening material 146 snugly wrapped about both the sock mouth and hose 140 provides a means for securing, and readily removing, the sock 142 in the event that cleaning is required. For ready inspection and access, the hose 140 and sock 142 are also suspended by the clasps 136 above the first hose 134 proximate the liquid level 116.

The above-described, bifurcated pump discharge arrangement offers two principal benefits. Liquid within the tank 18 is efficiently stirred or mixed by fluid jetting from the discharge opening 138 without excessive turbulence at depth tending to suspend in solution the granular detergent components disposed upon the barrel bottom. Further, undesirable matter, such as solid or semi-solid sediments which sometimes form when using hard water, may be simultaneously trapped in the sock 142 and removed from the tank 18.

A series of conduits 78, extending through the stationary portion 108 and beneath the fluid level 116, are provided for transferring the solution to the holding tanks 12, 14 and 16. Each conduit 78 includes a length of flexible plastic tubing having a foot valve 96 secured at its inlet. Each foot valve 96 includes an internally positioned, fine-meshed screen and a check valve (both not shown). The screens vent any undissolved inorganic material or other macroscopic debris from entering the conduits 78 whereas the check valves eliminate the possibility of fluid siphoning through the conduits into the dissolution tank 18. In the event that fluid level 116 happens to rise toward the top of the tank 18, an overflow line 125 is provided for diverting the overflow to a remote drain or collecting vessel (not shown).

In the operation of the apparatus illustrated in the drawings to produce a liquid solution fully saturated with an inorganic detergent constituent, it is first necessary to add water to the dissolution tank 18 so that such is approximately ⅔ full. Next, enough inorganic detergent constituent 118, in powdered, granular, pelletized or lumped form, is poured into the tank 18 through the open door 106 to raise the fluid level 116 to a point within its operating range. This quantity of inorganic material has been found to be sufficient to supply a car wash for several days. The resulting mixture is allowed to stand until sufficient inorganic material has been dissolved to form a saturated solution—approximately 1 hour under standard conditions.

To assist in rapidly achieving the saturated condition, the submersible pump 120 is energized by engaging the plug 127 of the electrical conduit 124 with an electrical current source such as a wall outlet. Under the influence of the jet-like discharge from the discharge opening 138, the liquid within the tank 18 will begin to slowly rotate above the granular material 118 disposed on the tank bottom. Although some saltation of individual grains may occur at the interface between the granular material and the rotating liquid above, no bedload movement of the granular material has been seen to develop or is required to rapidly obtain the desired condition wherein the water can dissolve no more granular material without a change in temperature. Likewise, the suspension of granular solids within the solution by rapid agitation thereof has not been found to greatly increase the rate of dissolution of the granular material. As the granular material itself is highly porous, rapid dissolution rates have been achieved by imparting a low velocity liquid flow therethrough by means of the liquid rotation described above.

It should be noted that the saturated concentration of inorganic material in water is a constant when variables such as: temperature, water quality, and chemical composition of the inorganic material are held steady. The usual installation of the instant invention in an urban environment offers both building structures to shield the apparatus from temperature extremes and municipal water sources of even quality. Therefore, as these variable conditions are, in fact, largely unchanging in applications where the instant invention is employed, a liquid having a known concentration of inorganic detergent constituent can be continuously produced from a granular or powdered solid material mixed with water.

As the saturated solution flows from the dissolution tank 18 through the conduit 78 toward the low pressure area created by the venturi chamber 42, the float valve 110 allows fresh water to enter the tank 18. Any undissolved inorganic material 118 remains at the tank bottom and is slowly depleted as water is added to the tank 18 through the float valve 32. Under the influence of the submersible pump 120, the fresh water rapidly mixes with the saturated solution already located within the tank 18 so as to create a temporary undersaturated condition. The undersaturated liquid, in turn, dissolves additional inorganic material 118 until the point of saturation is reached. Because the maximum amount of powdered inorganic material added to the tank 18 never exceeds ⅓ to ½ of the volume thereof, there is always a sufficient volume of solution in the tank 18 ensure that the measured proportion of inorganic material dissolved in the water always remains at, or near, saturated levels.

When the fluid level in any one of the holding tanks 12, 14, or 16 drops below a set elevation, as happens through the withdrawal of the finished detergent through pump means (not shown) for distribution in a car wash environment, the inorganic and organic detergent constituents as well as other additives are drawn through associated transfer tubes 78 and 94 into the venturi chamber 42 as water from the float valve 32 is jetted therethrough. As the pressure drop, or drawdown, induced by the vacuum of the venturi chamber 42 across each of the metering tips 72 and 74 is substantially the same, the relative proportions of the detergent constituents drawn into the venturi chamber 42 are controlled by simply varying the sizes of orifices 76 in the metering tips 72 and 74. Sufficient mixing occurs in the manifold 44, venturi chamber 42 and discharge tube 64 so that no additional blending or stirring of the detergent constituents is necessary to combine such after discharge into the holding tanks 12, 14 or 16. By varying the type and proportion of detergent constituents combined with the saturated inorganic liquid, finished detergents tailored to a particular application can be mixed in each individual holding tank. For example, holding tank 12 could be utilized for presoaking solution, holding tank 14 for car wash detergent, and holding tank 16 for tire cleaning solution. The finished detergent solutions can be retained in the holding tanks 12, 14 and 16 for withdrawal on an "as needed" basis. Depending upon the application, such may be further diluted with water for high pressure washing or used "as is" for presoaking, washing, engine degreasing, tire cleaning, or other applications.

While the foregoing invention description is particularly directed toward a detergent mixing apparatus and method for use in a car washing environment, it should be apparent that the instant apparatus and method can be employed to combine predetermined proportions of liquid and/or powdered chemical compositions with a pressurized stream of any liquid. Thus, it is to be understood that the sent invention is not limited to the sole embodiment described above, but encompasses any and all embodiments within the scope and spirit of the following claims.

I claim:

1. A method for mixing detergent chemicals comprising the steps of:
   dissolving an inorganic chemical composition in water to form a saturated solution supply;

providing a plurality of discrete liquid detergent additive supplies;

serially fluidly connecting at least one of said plurality of liquid detergent additive supplies and said saturated solution supply to a manifold;

drawing at least one liquid detergent additive and said saturated solution from said manifold and into a flowing stream of water; and, transferring said at least one liquid detergent additive and said saturated solution in said flowing stream of water to a holding tank.

2. The method as recited in claim 1 wherein said dissolving step comprises the step of stirring the water in contact with the inorganic chemical composition.

3. The method as recited in claim 1 wherein said drawing step comprises the steps of fluidly connecting said manifold to a venturi chamber and evoking a partial vacuum upon said manifold by directing said flowing stream of water through said venturi chamber.

4. A method for mixing detergent chemicals comprising the steps of:

dissolving a chemical composition in water to form a concentrated solution supply;

providing a plurality of discrete liquid detergent additive supplies;

serially fluidly connecting at least one of said plurality of liquid detergent additive supplies and said concentrated solution supply to a manifold; and, drawing at least one liquid detergent additive and said concentrated solution from said manifold and into a flowing stream of water.

5. The method as recited in claim 4 further comprising the step of transferring said at least one liquid detergent additive and said concentrated solution in said flowing stream of water to a holding tank.

6. The method as recited in claim 4 wherein said dissolving step comprises the step of stirring the water in contact with said chemical composition.

7. The method as recited in claim 4 wherein said drawing step comprises the steps of fluidly connecting said manifold to a venturi chamber and evoking a partial vacuum upon said manifold by directing said flowing stream of water through said venturi chamber.

* * * * *